United States Patent [19]

Aoki et al.

[11] Patent Number: 5,136,683
[45] Date of Patent: Aug. 4, 1992

[54] FLAME-RETARDANT CABLE

[75] Inventors: Kazunori Aoki, Tokyo; Takara Yamamoto; Eiji Maeda, both of Toyama, all of Japan

[73] Assignee: Mitsubishi Rayon Company, Ltd., Japan

[21] Appl. No.: 580,414

[22] Filed: Sep. 10, 1990

[30] Foreign Application Priority Data

Sep. 14, 1989 [JP] Japan ................ 1-238759
Sep. 14, 1989 [JP] Japan ................ 1-238760

[51] Int. Cl.⁵ ............................................ G02B 6/44
[52] U.S. Cl. ................................ 385/141; 385/128; 385/100; 385/102
[58] Field of Search ............ 350/96.2, 96.21, 96.22, 350/96.23; 385/100, 102, 128, 141

[56] References Cited

U.S. PATENT DOCUMENTS

| | | | |
|---|---|---|---|
| 4,575,184 | 3/1986 | Ueno et al. | 350/96.23 |
| 4,679,898 | 7/1987 | Grooten | 350/96.23 |
| 4,772,091 | 9/1988 | Oestreich | 350/96.23 |
| 4,852,965 | 8/1989 | Mullin et al. | 350/96.23 |
| 4,881,794 | 11/1989 | Bartoszek | 350/96.23 |
| 4,957,345 | 9/1990 | Sakuma et al. | 350/96.23 |

*Primary Examiner*—John D. Lee
*Assistant Examiner*—Phan T. Heartney
*Attorney, Agent, or Firm*—Finnegan, Henderson, Farabow, Garrett & Dunner

[57] ABSTRACT

The flame-retardant cable of this invention is a single-core or multiple-core cable comprising a plastic optical fiber and at least one covering material covering this plastic optical fiber, and this flame-retardant cable is characterized in that at least one covering material is a highly flame-retardant resin, for example, a highly flame-retardant resin having an oxygen index (OI) of at least 32, preferably from 40 to 45, such as chlorinated polyethylene. This flame-retardant cable has an excellent flame retardancy with no lowering of the performances of the optical fiber. Moreover, the cable has an excellent flame resistance.

10 Claims, 3 Drawing Sheets

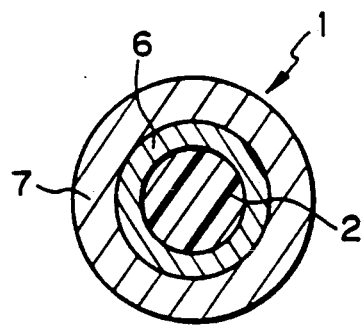
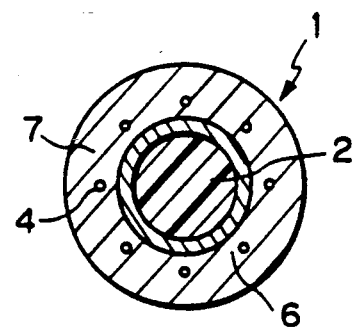
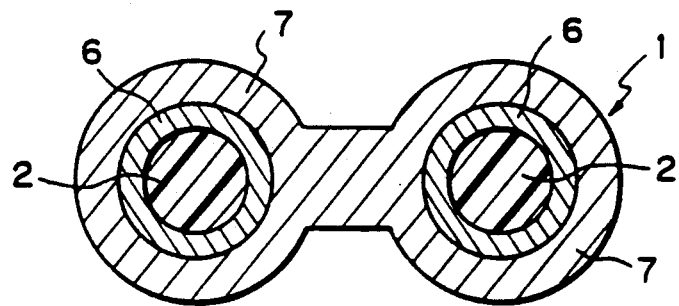
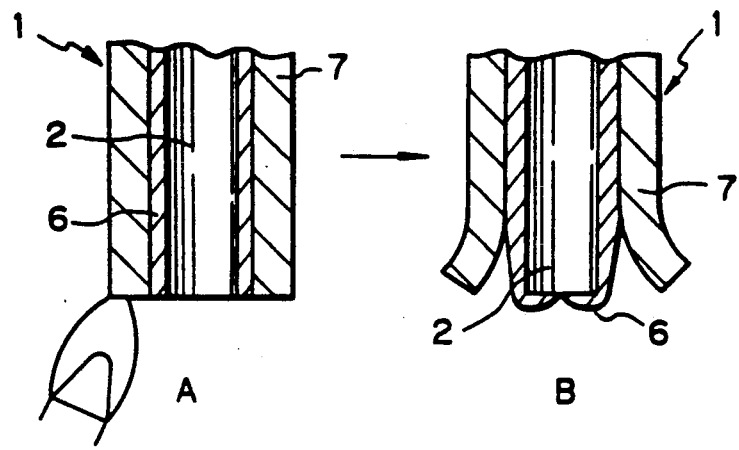

FLAME-RETARDANT CABLE

BACKGROUND OF THE INVENTION

1. Field of the Invention

This invention relates to an optical fiber cable. More particularly, the present invention relates to a flame-retardant cable having an excellent flame retardancy and retaining a light-transmitting property of an optical fiber.

2. Description of the Related Art

An inorganic glass optical fiber having an excellent light-transmitting property over a broad wavelength range is known and used as the conventional optical fiber, but the inorganic glass optical fiber is defective in that the processability is poor and the flexural stress is weak. In contrast, a plastic optical fiber has a higher pliability than the glass optical fiber, and has a high processability. Moreover, improvements in the plastic optical fiber-preparing technique have made the light-transmitting distance of the optical fiber long, and thus plastic optical fibers are now utilized as optical fibers for short-distance LAN and light information-transmitting members for various communications. Namely, the range of application for plastic optical fibers has been expanded.

When utilized in various fields, the plastic optical fiber is used in the form of a cable or cord fabricated by covering a single-core or multiple-core optical fiber with a protecting covering material (jacket material), or an optical fiber cable fabricated by combining a optical fiber yarn or an assembly thereof with a tension member or the like.

When a sheet formed by many plastic optical fibers joined in parallel is used, the sheet is covered with a protecting covering material (jacket material) and combined with a tension member or an electric wire.

Materials heretofore used as the protecting covering material for a plastic optical fiber are limited to polyvinyl chloride, polyethylene and the like.

Unlike nonflammable glass fibers, flammable plastic optical fibers are burnt, or dripping occurs when these fibers come into contact with a flame. When the conventional covering material is used, it is difficult to obtain a cable having an excellent flame retardancy from a plastic optical fiber. Moreover, even if a conventional flame-retardant material is used as the covering material, the flame-retardant component migrates into the optical fiber with a lapse of time, and thus the transparency of the fiber per se becomes poor.

SUMMARY OF THE INVENTION

This invention has been completed under the above-mentioned background, and a primary object of the present invention is to provide a flame-retardant cable having an excellent flame retardancy and wherein the fiber performances are not lowered with a lapse of time and dripping does not occur in the cable even if the cable comes into contact with a flame.

In accordance with the present invention, there is provided a flame-retardant single-core or multiple-core cable, which comprises a plastic optical fiber and at least a covering material covering the optical fiber, wherein at least one covering material is composed of a highly flame-retardant resin having an oxygen index (OI) of at least 32, for example, chlorinated polyethylene, preferably chlorinated polyethylene having an oxygen index (OI) of from 40 to 45.

In accordance with another aspect of the present invention, there is provided a flame-retardant single-core or multiple-core cable, which comprises a plastic optical fiber and at least two covering materials covering the optical fiber in the lamellar form, wherein the covering material of the outer layer is composed of a highly flame-retardant resin, preferably chlorinated polyethylene having an oxygen index (OI) of at least 32, especially preferably chlorinated polyethylene having an oxygen index (OI) of from 40 to 45, and the covering material of the inner layer is composed of a highly fusible resin which is wetted on the surface of the optical fiber at a temperature higher than the softening point, preferably chlorinated polyethylene having an oxygen index (OI) of from 25 to 36, especially preferably chlorinated polyethylene having an oxygen index (OI) of from 27 to 35.

The following effects can be attained by the flame-retardant cable of the present invention.

(1) Since a highly flame-retardant resin having a large oxygen index is used as the covering material, the cable has an excellent flame retardancy.

(2) Especially when chlorinated polyethylene is used, the resin component does not migrate into the interior of the optical fiber even with a lapse of time, and therefore, the performances of the optical fiber are not lowered.

(3) When the cable comes into contact with a flame, dripping does not occur in the cable.

(4) Because of the mechanical characteristics of chlorinated polyethylene as the covering material, a good fitting property to a connector is given to the cable.

(5) When the cable comes into contact with a flame, the exposed optical fiber core is enveloped in the covering material of the inner layer and the flammable fiber is prevented from coming into direct contact with the flame, and therefore, a high flame resistance can be given to the cable.

BRIEF DESCRIPTION OF THE DRAWINGS

FIG. 6 is a sectional view illustrating one embodiment of the multi-layer flame-retardant optical fiber cable of this invention;

FIG. 7 is a sectional view illustrating one modification of the multi-layer flame-retardant cable of this invention;

FIG. 8 is a sectional view illustrating another modification of the multi-layer flame-retardant cable of the present invention;

FIG. 9 is a diagram illustrating the flame-retardant action of the multi-layer flame-retardant cable of this invention;

DESCRIPTION OF THE PREFERRED EMBODIMENTS

In the instant specification and appended claims, the term "oxygen index (OI)" means the oxygen content (%) in the atmosphere necessary for combustion of a sample resin. More specifically, by using an apparatus specified in the Japanese Industrial Standards (JIS K-7201), shown in FIG. 11 of the accompanying drawings, the flow quantity $[O_2]$ of oxygen necessary for a test piece to burn continuously for a combustion time of at least 3 minutes, or to continue combustion along a combustion length of at least 50 mm after ignition, was measured, and the oxygen index (%, OI) calculated according to the following formula:

$$OI = \frac{[O_2]}{[O_2] + [N_2]} \times 100\ (\%)$$

wherein $[N_2]$ represents the flow quantity (%) of nitrogen similarly measured.

Figure 11:
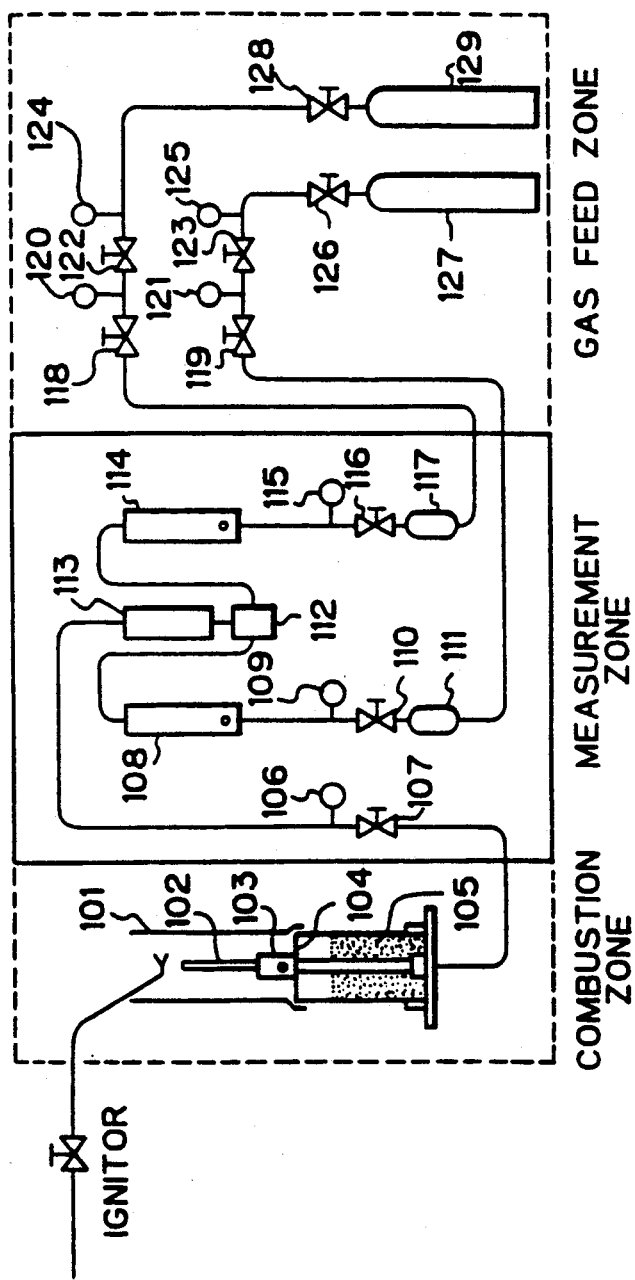

The apparatus shown in FIG. 11 comprises a combustion zone, a measurement zone, and a gas feed zone. In FIG. 11, reference numeral 101 represents a combustion cylinder, 102 represents a test piece, 103 represents a test piece-holding member, 104 represents a metal net, 105 represents a glass ball, 106 represents a leakage-inspecting pressure gauge, 107 represents an inspection valve, 108 represents a nitrogen flow meter equipped with a flow quantity-adjusting valve, 109 represents a nitrogen pressure gauge, 110 represent a nitrogen pressure-adjusting member, 111 and 117 each represent a cleaner, 112 represents a gas mixer, 113 represents a gas mixture flow meter, 114 represents an oxygen flow meter equipped with a flow quantity-adjusting valve, 115 represents an oxygen pressure valve, 116 represents an oxygen pressure-adjusting member, 118, 119, 126 and 128 each represent a valve, 120 and 121 each represent a feed pressure-measuring gauge, 122 and 123 each represent a pressure regulator, 124 and 125 each represent a main pressure-measuring gauge, 127 represents a nitrogen bomb, and 129 represents an oxygen bomb.

In the cable of this invention having the abovementioned structure, the plastic optical fiber can act as a light-transmitting medium, and the optical fiber cable constructed by covering the surface of the optical fiber with the covering material can function as a light-transmitting cable.

In the present invention, since the covering material has a high flame retardancy characterized by an OI value of at least 32, even if the core is combustible, the cable as a whole can be kept flame-retardant.

Especially when chlorinated polyethylene having an OI value of at least 32 is used as the covering material, very little migration of the resin component into the optical fiber occurs, even with a lapse of time, and does not have an adverse influence on the light-transmitting performances of the optical fiber. Moreover, since the chlorinated polyethylene has a characteristic property such that dripping does not occur even when coming into contact with a flame, the occurrence of dripping in the cable can be prevented.

Furthermore, in the cable of this invention comprising at least an outer layer of a highly flame-retardant resin and an inner layer of a highly fusible resin as the covering layer, since the covering material has a multi-layer structure comprising a plurality of flame-retardant layers and the outer layer is a highly flame-retardant layer, even if the core is combustible, a high flame retardance is maintained in the cable as a whole.

For example, as shown in FIG. 9, when the cable 1 is heated by a flame (FIG. 9-A), the highly fusible resin having a low softening point, which constitutes the inner layer 3 of the covering material, is easily wetted on the optical fiber to envelop the combustible plastic optical fiber core 2 therein (FIG. 9-B), whereby the optical fiber is prevented from coming into contact with a high-temperature flame and the flame retardancy and flame resistance of the cable is improved.

This invention will now be described in detail with reference to the following embodiments, which by no means limit the invention.

Figure 1:
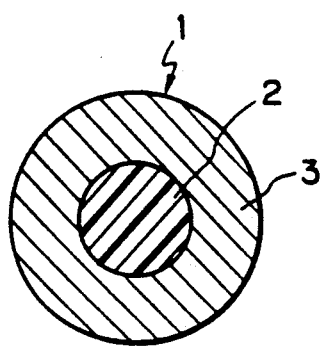
FIG. 1 is a sectional view illustrating one embodiment of the flame-retardant cable of this invention.

One embodiment of the flame-retardant optical fiber cable 1 of the present invention is illustrated in FIG. 1.

The flame-retardant single-core plastic optical fiber cable 1 of this embodiment comprises one plastic optical fiber 2 and a covering material 3 bonded to this optical fiber.

The optical fiber used in the present invention is a plastic optical fiber, and as examples of the plastic optical fiber there can be mentioned a step index type multi-mode optical fiber comprising a cladding and a core, in which the refractive index is changed stepwise, a step index type single-mode optical fiber having a single mode, in which the refractive index is changed stepwise, and a graded index type multi-mode optical fiber in which different modes are transmitted. As the core-constituting material, there can be mentioned a polymethyl methacrylate resin (PMMA; homopolymers and copolymers of methyl methacrylate are included in the polymethyl methacrylate resin in the instant specification), deuterated PNNA, a polystyrene type polymer, a polycarbonate type polymer, poly-4-methylpentene-1 and a silicone type polymer. As the cladding material, a material having a refractive index lower than that of the core material, such as a fluorine type polymer, a vinylidene fluoride polymer or a perfluoroalkyl methacrylate polymer, or a methacrylic acid ester polymer, can be used.

At least one of the covering materials used in the present invention is a flame-resistant resin having an oxygen index (OI) of at least 32, such as chlorinated polyethylene, especially chlorinated polyethylene having an oxygen index of from 40 to 45.

Furthermore, polyethylene, polyvinyl chloride, an Eval type polymer, a water-crosslinked polyolefin, polyvinylidene chloride, polyvinylidene fluoride, polyfluoroethylene, other halogen-containing polymers, and copolymers thereof can be used.

Customarily used additives such as carbon black, other fillers, various reinforcers, flame-retardant agents and fire-resisting agents can be added to the covering material, so long as the object of this invention can be attained. As the flame-retardant agent, for example, there can be used tetrabromoethane, chlorinated paraffin, chlorinated polyethylene, tetrabromobisphenol A, hexachlorobenzene, perchloro-cyclopentadecane, triethyl phosphate, tributyl phosphate, triphenyl phosphate, octyldiphenyl phosphate, bis (2,3-dibromopropyl) phosphate, tris($\beta$-chloroethyl) phosphate, bis(2,3-dibromopropyl)-2,3-dichloropropyl phosphate, tris(2,3-dibromopropyl) phosphate, antimony trioxide, aluminum hydroxide, hexachloroendomethylene-tetrahydrophthalic acid, hexachloroendomethylene-tetrahydrophthalic anhydride, and mixtures of two or more thereof. Of these, antimony trioxide and aluminum hydroxide are especially preferred.

Figure 2:
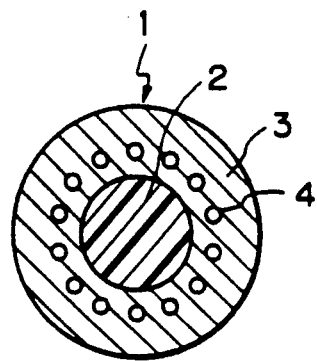
FIG. 2 is a sectional view illustrating one modification of the flame-retardant cable of this invention.

The flame-retardant cable of this invention is not limited to the above embodiment, and various modifications thereto can be made. For example, as shown in FIG. 2, the covering material can be combined with a tension member. As the means for arranging the tension member in the cable, a method can be adopted in which the tension member is interposed at the spinning or covering step and a covering layer is formed.

Figure 3:
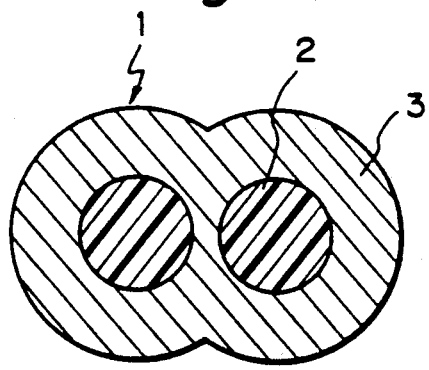
FIG. 3 is a sectional view illustrating another modification of the flame-retardant cable of this invention.

In the foregoing embodiment, a single-core cable comprising one optical fiber 2 covered with the covering material is illustrated. A two-core cable can be constructed by covering two optical fibers with the covering material 3, as shown in FIG. 3.

Figure 4:
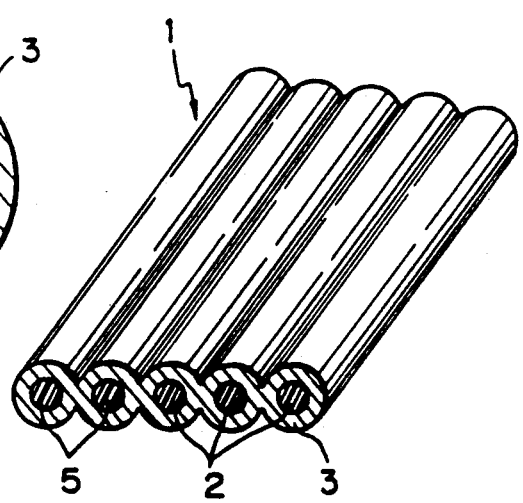
FIG. 4 is a perspective view illustrating one modification of the flame-retardant cable of this invention.

According to another embodiment of the present invention, there is provided a multiple-core electric wire/optical fiber composite cable 1 in which not only an optical fiber 2 but also a metallic electric wire core 5 is covered, as shown in FIG. 4.

Figure 5:
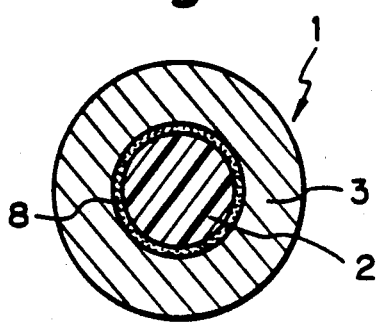
FIG. 5 is a sectional view illustrating another modification of the flame-retardant cable of this invention.

According to still another embodiment of the present invention, there is provided a cable in which an optical fiber is coated and covered with not only a flame-retardant covering material but also a layer 8 of a functional covering material, as shown in FIG. 5.

One embodiment of the multi-layer flame-retardant plastic optical fiber cable according to the present invention is illustrated in FIG. 6.

The flame-retardant single-core plastic fiber cable 1 of this embodiment comprises one plastic optical fiber 2, an inner layer 6 of a covering material located on the side of the optical fiber core, and an outer layer 7 of a covering material.

The covering material of the outer layer 7 used in the present invention is a highly flame-retardant resin such as a flame-retardant resin having an oxygen index (OI) of at least 32, for example, chlorinated polyethylene, preferably chlorinated polyethylene having an oxygen index of from 40 to 45.

The covering material of the inner layer 6 used in the present invention is a highly fusible resin which is wetted on the surface of the optical fiber when heated at a temperature higher than the softening point thereof, preferably chlorinated polyethylene having an oxygen index (OI) of from 25 through 36, especially preferably chlorinated polyethylene having an oxygen index (OI) of from 27 to 35.

The flame-retardant cable of the present invention is not limited to the foregoing embodiment, and various modifications thereto can be made. For example, the covering materials can be combined with a tension member 4, as in a modification shown in FIG. 7. As the means for arranging the tension member in the cable, a method can be adopted in which the tension member is interposed at the spinning or covering step and covering layers are then formed.

The cable of the foregoing embodiment is a single-core cable comprising one optical fiber 2 covered with a two-layer covering material. A modification can be adopted in which a two-core cable is constructed by covering two optical fibers with two covering materials 6 and 7, as shown in FIG. 8.

According to still another embodiment of the present invention, there is provided a multiple-core electric wire/optical fiber composite cable.

Figure 10:
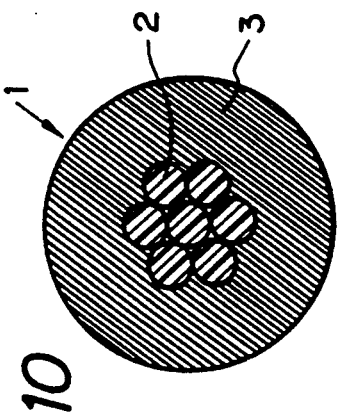
FIG. 10 is a sectional view illustrating one embodiment of the flame-retardant multiple-core optical fiber cable of this invention; and, FIG. 11 is a diagram showing an apparatus for measuring the oxygen index (OI).

A further embodiment of the present invention is illustrated in FIG. 10. According to this embodiment, a plurality of optical fibers are placed in parallel in the form of a bundle, and this optical fiber bundle 2 is covered with a covering layer of a flame-retardant resin having an oxygen index (IO) of at least 32.

The preparation of the flame-retardant plastic optical fiber cable of this invention is accomplished, for example, by preparing an optical fiber having a core/sheath structure, and covering a predetermined covering material on this cable by using a cable covering machine to form a desired flame-retardant optical fiber cable.

When samples of the flame-retardant plastic optical fiber cable according to the present invention as shown in Table 1 below were evaluated, it was found that the samples passed the vertical flame test VW-1 according to UL-1060 of the UL (Underwriters Laboratories) Standards.

TABLE 1

| Sample 1 | |
|---|---|
| Plastic optical fiber: | PMMA (SK-40, Mitsubishi Rayon Co., Ltd.) $\phi$ 1.0 mm |
| Covering layer: | Chlorinated polyethylene having an oxygen index of 34 to 35, layer thickness of 0.6 mm |
| Sample 2 | |
| Plastic optical fiber: | PMMA (SK-40, Mitsubishi Rayon Co., Ltd.) $\phi$ 1.0 mm |
| Inner covering layer: | Chlorinated polyethylene having an oxygen index of 28, layer thickness of 0.3 mm |
| Outer covering layer: | Chlorinated polyethylene having an oxygen index of 44, layer thickness of 0.3 mm |

We claim:

1. A flame-retardant optical fiber cable having an excellent flame retardancy, which comprises a plastic optical fiber and one covering material covering the optical fiber, wherein the covering material is composed of chlorinated polyethylene having an oxygen index (OI) of at least 32.

2. A flame-retardant cable as set forth in claim 1, which is a single-core cable.

3. A flame-retardant cable as set forth in claim 1, which is a multiple-core cable.

4. A flame-retardant cable as set forth in claim 1, wherein the flame-retardant resin is chlorinated polyethylene having an oxygen index (OI) of from 40 to 45.

5. A flame-retardant cable having an excellent flame retardancy, which comprises a plastic optical fiber and at least two covering materials covering the optical fiber in lamellar form wherein the covering material of the outer layer is composed of chlorinated polyethylene having an oxygen index (IO) of at least 32 and the covering material of the inner layer is composed of a highly fusible resin which is wetted on the surface of the optical fiber at a temperature higher than the softening point thereof.

6. A flame-retardant cable as set forth in claim 5, wherein the highly fusible resin is chlorinated polyethylene having an oxygen index (IO) of from 25 to 36.

7. A flame-retardant cable as set forth in claim 5, which is a single-core cable.

8. A flame-retardant cable as set forth in claim 5, which is a multiple-core cable.

9. A flame-retardant cable as set forth in claim 5, wherein the highly flame-retardant resin is chlorinated polyethylene having an oxygen index (OI) of from 40 to 45.

10. A flame-retardant cable as set forth in claim 5, wherein the highly fusible resin is polychlorinated polyethylene having an oxygen index (OI) of from 27 to 35.

* * * * *

UNITED STATES PATENT AND TRADEMARK OFFICE
CERTIFICATE OF CORRECTION

PATENT NO. : 5,136,683
DATED : August 4, 1992
INVENTOR(S) : Aoki Kazunori, Eiji Maeda Yamamoto It is certified that error appears in the above-identified patent and that said Letters Patent is hereby corrected as shown below:

Claim 5, column 6, line 48, after "form," insert --,--; and
line 50, "(IO)" should read --(OI)--.

Claim 6, column 6, line 57, "(IO)" should read --(OI)--.

Signed and Sealed this

Seventeenth Day of August, 1993

Attest:

BRUCE LEHMAN

Attesting Officer

Commissioner of Patents and Trademarks